J. Birch, A. Crosby & T. Birch,
Harvesting Machine.

No. 104695 — Patented Jun 28 1870

Witnesses
A. Orris
J. C. Horst

James Birch
Addison Crosby
Thomas Birch

J. Birch, A. Crosby & T. Birch,
Harvesting Machine.
Fig. 2.
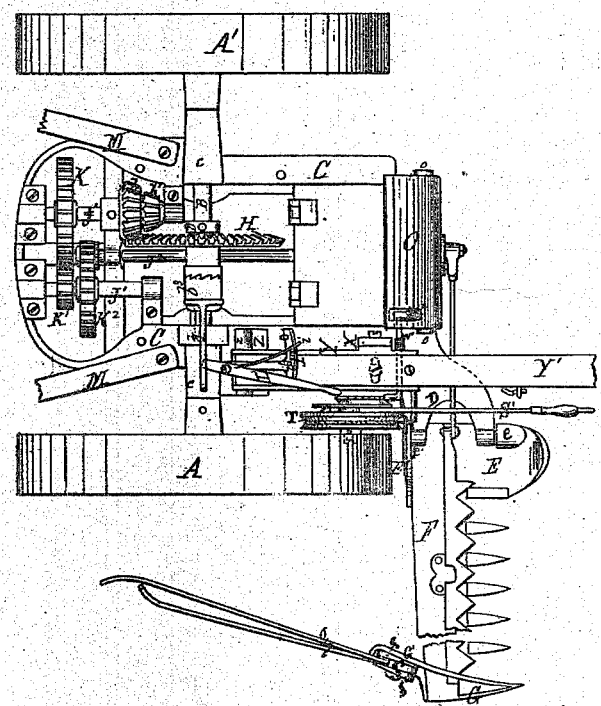
Fig. 6.
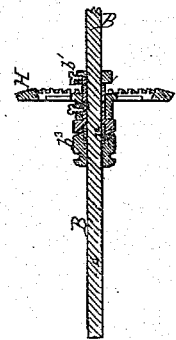
Fig. 3
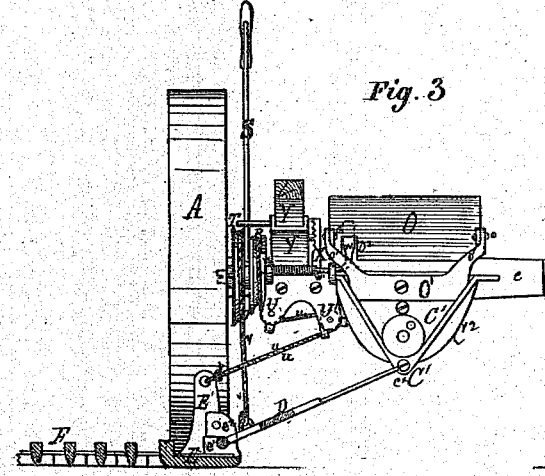
Fig. 5.

United States Patent Office.

JAMES BIRCH AND ADDISON CROSBY, OF WESTFIELD NEW YORK, AND THOMAS BIRCH, OF MEADVILLE, PENNSYLVANIA.

IMPROVEMENT IN HARVESTERS.

*Specification forming part of Letters Patent No. 104,695, dated June 28, 1870.*

*To all whom it may concern:*

Be it known that we, JAMES BIRCH and ADDISON CROSBY, of Westfield, county of Chautauqua, State of New York, and THOMAS BIRCH, of Meadville, county of Crawford, State of Pennsylvania, have invented certain new and useful Improvements in Harvesting-Machines, of which the following is a full, clear, and exact description, reference being had to the accompanying drawing, making a part of this specification, in which—

Figure 1:
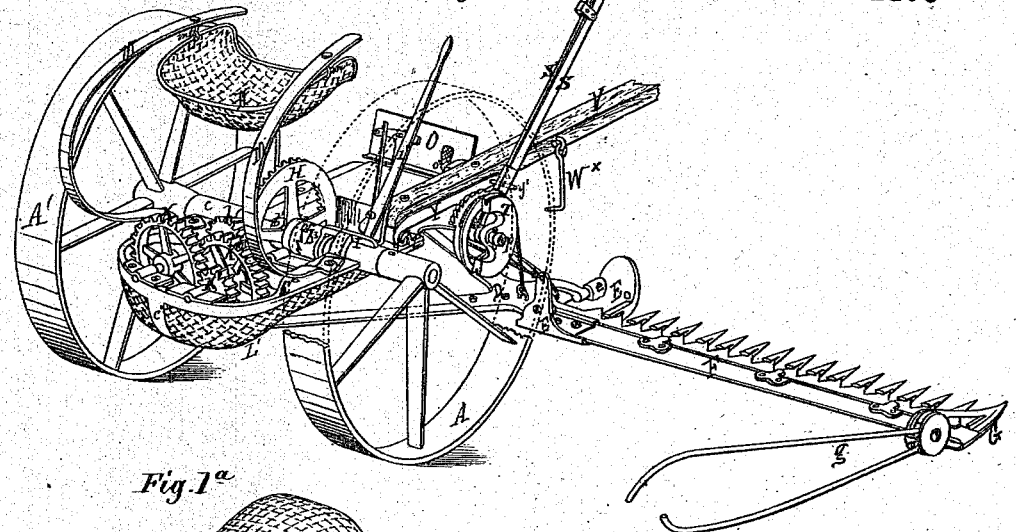
Figure 4:
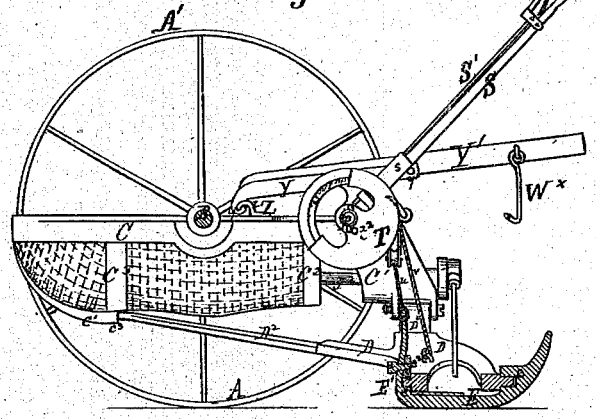
Figure 8:
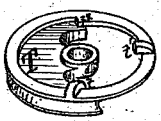
Figure 9:

Figure 1 is a perspective view of a harvesting-machine embracing our improvements. Fig. 2 is plan or top view; Fig 3, a front elevation, and Fig. 4 a longitudinal vertical section, of the same. Fig. 5 is a bottom view of the main frame and coupling-frame or drag-bar, and Figs. 1ª, 6, 7, 8, 9, and 10 represent parts of the machine detached, and hereinafter described.

Similar letters of reference denote corresponding parts in all the figures.

Our invention relates to the construction of the main frame and of the gear-casing, the arrangement of the gearing and of the gear-shipping devices; to the construction and manner of supporting the driver's seat; to the means for giving the desired adjustments of the tongue; to the construction of the forked hinged coupling or drag-bar frame, and the manner of connecting the same with the frame and shoe; also, to the construction and arrangement of the lifting devices, and to the means for adjusting the angle of the track-clearer, as hereinafter described.

To enable others to undertand and use our improvements, we will proceed to describe the same in detail with reference to the drawing.

In said drawing, A A' represent the main driving and carrying wheels, mounted upon a common axle, B, the former of said wheels, A, being, by preference, keyed or otherwise firmly connected to the axle, and constituting the driving-wheel, while the wheel A' serves simply as a carrying-wheel, and running loosely on its shaft, in such manner as to concentrate the driving-power of the machine upon the inner or right-hand wheel. C represents a skeleton-truss main frame. (Shown detached in bottom view, Fig. 5.)

The construction of this frame is as follows:

The upper face of the frame throughout its entire extent, with the exception of the tubular boxes $c$ $c$, which rise one-half their diameter above the frame, is formed all in the same, or about the same, plane, and the lower face of the sides and forward end of the frame has an angle-iron frame, the upright rib of which extends from the inner edge of the upper or horizontal portion at an obtuse angle, and at the extreme forward end of the sides this angle-iron extends and meets the corresponding angle-iron from the opposite side, forming a V-shaped bracket. These two sides or angle-irons forming the bracket are connected by a web, which is placed centrally of their width, and forms, in connection therewith, a double angle or T-shaped iron front, $C^1$.

At a short distance in rear of this angle-iron or bracket $C^1$ is located an angle-iron rib, in the form of an inverted arch, (shown at $C^2$,) and in rear of this is one or more inverted arches or curved ribs, $C^3$, connecting the sides of the frame, and from the rear end of the frame a curved brace extends downward and forward, connecting with the rear transverse rib $C^3$, and if desired, extending from said rib forward to the rib $C^2$, as shown at $c^1$ $c^2$, thereby forming a light but strong truss-frame.

The sides of the frame are provided with sleeves $c$ $c$, to receive the axle, and the rear longitudinal rib $c^1$ is provided with a socket, at $c^3$, to receive a pin on the rear end of the coupling-frame D.

The angle-bracket $C^1$ is provided on its lower face with perforated lugs or ears $c^x$ $c^x$, between which is secured the forward arm of the coupling-frame D by means of a bolt passing through said lugs and through a sleeve on the end of said arm.

The above-named parts of the frame C are, by preference, cast in one piece therewith, for the purpose of economy, and avoiding the use of bolts or other fastening devices, but it will be obvious that several of the parts may be formed separately and attached to said frame.

The coupling-frame or drag-bar D, (also shown most clearly in bottom-view, Fig. 5,) is, by preference, formed in three parts or pieces, but may, if desired, be cast in one piece. These parts are indicated at D D¹ D², the former, D, being cast in one piece in angle-iron or ribbed form and forked at its ends.

The outer end of piece D, which connects with the shoe, has pins $d\ d'$ formed upon its arms, which serve as the pivot upon which the shoe and cutter-bar vibrate or are hinged, and the inner end or arms of plate D is provided on its under face with sockets, to receive wrought-iron arms or bars $D^1\ D^2$, the former of which has a sleeve at its main-frame end, and the latter a pin or pivot, for forming the connection with the main frame, as above described.

The inner shoe (represented at E,) is also cast with ribs, both longitudinal and transverse, the transverse rib forming a socket to receive the heel end of the finger-bar, and the longitudinal rib forming the inner slotted guard or finger.

$e$ represents a socket formed in the shoe, to receive the pin or pivot on the forward arm of coupling arm or plate D.

The transverse rib, at the heel of the shoe, rises into a standard, E', which forms a lever for raising the outer end of the finger-bar when in operation, and also serves as a stop for holding the bar in a vertical position by resting on the coupling-arm when the bar is raised or folded for transportation.

On the front face of this standard E' is formed a U-shaped or nearly semicircular socket, the outer arm of which rises slightly above or is longer than the inner, for receiving the greater strain due to backward thrust of the finger-bar when in operation.

In this socket the rear pivot on the outer end of the coupling-arm rests, being held in place by a cap-plate, $e^2$, with a corresponding semicircular socket on its lower face, which matches over said pivot. Said plate $e^2$ is bolted to the standard E', and can be readily removed or replaced for attaching or detaching the cutting apparatus and shoe from the coupling-frame.

Figure 10:
Figure 7:
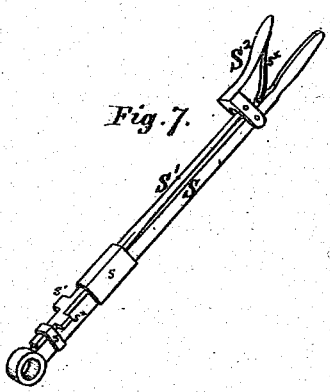

The outer or divider shoe G is formed of sheet metal stamped up into the form represented in the detached view, Fig. 10—that is to say, with the bottom made convex and in runner form, and with the inner upright side slotted to receive the finger-bar, and to admit the play of and to afford a cutting-bearing for the outer sickle-section. This inner upright portion, marked G', extends in rear of the finger-bar, and forms a support for the track-clearer $g$, which is connected thereto as follows: $g\ g'$ are taper washers, which have between them a straight washer, $g^2$, notched or cut away at its rear portion to receive and permit the required vibration of the track-clearer. These several washers, together with the clearer itself, are fastened to the arms G' of shoe G by a through-bolt. By loosing this bolt and turning the taper washer thereon, the track-clearer may be set at any desired angle of inclination to the track of the machine, to adapt it to the work required of it.

An ear or lug, formed on the rear end of upright G', extends between the arms of and through a slot in the track-clearer, and serves to limit the extent of its throw.

The particular form of the shoe G may be varied to suit the ideas of the manufacturer. The cutting apparatus F, except in the points above referred to, may be of any desired or usual construction.

The gearing for operating the cutter is arranged as follows: On the rotating shaft or axle B is mounted a loose sleeve, $b$, one end of which abuts against a collar, $b^1$, keyed or otherwise fastened to the axle, and the other end is provided with a clutch-face or hub, which is counterbored to receive a second collar, $b^2$, also fastened to the axle, and serving, in connection with collar $b^1$, to prevent end movement of the sleeve $b$.

The sleeve $b$ is feathered, and has an adjustable bevel-wheel, H, mounted upon it, which is held at the desired point of adjustment by means of a set-screw, or other suitable device for the purpose. The portion of the shaft outside of the collar $b^2$ is also feathered, and has mounted upon it a sliding clutch, $b^3$, which matches with the clutch-face or sleeve $b$, and, when engaged therewith, serves to rotate said sleeve and bevel-wheel with the axle.

The face of clutch $b$ is also counterbored to permit it to pass over the collar $b^2$. Said clutch is grooved to receive the forked or crescent end of a shipping-slide, I, which works in guides formed by lugs or ears attached to the main frame. The slide, at or near its opposite end, is slotted to receive the lower end of a spring shipping-lever, $I^1$, pivoted in an inclined standard, $I^2$. A spring, $i$, connected with said lever $I^1$, serves, by its tension, to hold the clutch $b^3$ always engaged with the clutch on sleeve $b$ when not held out by the hand of the operator, or by a pin, $i^1$, on standard $I^2$.

J is a pinion or counter-shaft arranged in bearings in the main frame, and at right angles to the main axle, and provided at its forward end with two bevel-pinions, $h\ h'$, which are cast or otherwise firmly united together, and are made adjustable endwise on the shaft J, being held at the desired point of adjustment by a set-screw, or equivalent device, to cause one or the other of said pinions to engage with the adjustable bevel driving-wheel H. The pinions $h\ h'$ are made of different diameters, and the speed of shaft J is varied to suit the work to be accomplished, according as one or the other of said pinions is engaged with the bevel driving-wheel.

On the rear end of shaft J is a spur-wheel, K, which engages with a pinion, $K^1$, on shaft $J^1$, which carries also a spur-wheel, $K^2$, which, in turn, drives a pinion on the rear end of the crank-shaft $J^2$, which, at its forward end, is provided with the usual crank and connecting-rod for operating the cutters.

By the above arrangement it will be seen that we "speed up" the gear three times, thereby enabling us to use small gears, and gears of nearer equal diameter, and also provide for a change of speed to adapt the machine to the different kinds of work to be done, while at the same time dispensing with superfluous driving-gears, and obviating the additional friction and weight of machine consequent upon the use of such additional gears.

The construction of the truss-frame in connection with the arrangement of gearing enables us to place the crank-shaft in a horizontal, or nearly horizontal, position, and at the required distance below the main axle, and, at the same time, to support said shaft in bearings on the inverted arch-ribs, and at the bottom of the web connecting the front angular bracket $C^1$, thereby obviating the end thrust of the crank consequent upon placing the crank-shaft in an inclined position, and the oscillation of the pitman-head resulting therefrom.

Figure 1A:
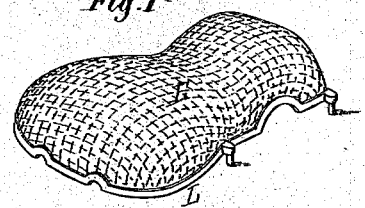

For inclosing the gearing, we construct skeleton-frames, the upper one of which is represented at L, in the detached perspective view, Fig. 1a, made of wrought-iron, the form of the frame conforming to the portion of the main frame, to which it is to be applied.

By preference, we make these frames either double or in U form, adapting them to receive the ends of the sheet of wire-gauze or perforated sheet metal, L′, which constitutes the inclosing-casing, but any suitable construction of these cover-frames may be used. The casing, which, as above stated, is made of wire-gauze or perforated metal, is stamped up into proper shape to incase the gearing, in dies of the required form, and while in the dies the ends of the wire are trimmed and secured to the frame L. If the wire casing is then immersed in a bath of zinc, tin, or other galvanizing metal, the meshes or wires where they cross each other are firmly soldered together, and all danger of rust is obviated, and a very light, strong, and substantial casing is formed, which effectually prevents the access to the gearing of all large particles or substances which would obstruct its operation, while, at the same time the casing is sufficiently open to permit the finer particles of dust or grit to escape or be blown out by the wind.

M M are C-shaped seat-springs attached at the foot or lower end to the main frame, one on each side at or near the axle, and carrying at their upper ends the driver's seat N, supported thereon at a point nearly over or slightly forward of the point of attachment of the springs to the frame. The seat is suspended from the upper arms of the C-springs by links $m$ $m$, provided at their lower ends with hooks or eyes, which embrace the side wires or frame of the seat N at such points as shall cause the seat to be about evenly balanced thereon. The seat is composed of fine wire-gauze or other pliable material, such as canvas, leather, or india-rubber, which will yield to conform to the figure of the person occupying the same, being thereby made much easier for the driver, while, at the same time, the driver is more firmly held in position, and the danger of his being thrown from the seat while passing over rough ground and meeting obstructions is greatly lessened. The danger is further diminished by the form of the supporting-springs, which is such that when the machine meets an obstruction the thrust or movement of the seat is downward instead of forward, as in the usual construction of seat and springs. The seat-frame may be formed to receive the edges of the wire-gauze, or other pliable material, in the same manner as the gear-casing above described, or in any suitable manner.

O is a driver's foot plate or board, pivoted at $o$ $o$ in upright arms $o^1$ on a plate, O′, attached to the forward end of the main frame. Said foot-plate has a rib or flange at its rear or bottom edge, which gives the required strength and stiffness to the plate, and at the same time affords a rest for the heel of the driver's foot. The plate is slotted at $o^2$ to receive the end of a tripping-lever, hereinafter referred to. This pivoted foot-rest enables the driver to adapt it to his height, and to vary the position of his feet, thereby adding to his ease and comfort while operating the machine.

The devices for controlling the raising of the cutting apparatus are shown detached in Figs. 7, 8, 9, and 10, and are constructed and arranged as follows:

The front inner corner of the main frame is armed with a stud-shaft, $p$, on which is mounted a ratchet-sheave or pulley, R, a hand-lever, S, and a second sheave or pulley, T, in the order named.

The sheave R is provided with a grooved face to receive a lifting-cord, $u$, and is armed at its inner side with a ratchet, $r$, through which, in connection with a spring pawl or dog, hereinafter referred to, the sheave is held at the desired point of adjustment.

On the inner face of said sheave is also a lug, $r^1$, which strikes against a flange on the main frame, and limits the forward throw of the sheave when released from the holding-pawl, and from the action of the hand-lever.

On the outer face of sheave R is a pin, $r^2$, which plays between lugs $t$ $t^1$ on sheave T, for a purpose which will be explained.

The sheave T is also provided with a grooved face to receive a second lifting-cord, $v$, and, on its outer face, with a pin, $t^2$, which strikes against a pin passing through the outer end of the stud-shaft $p$, and serves thereby to limit the forward throw of said sheave T when released from the action of the hand-lever.

The lever S, which is mounted loosely on the stud-shaft between the sheaves R and T, has mounted upon it a sliding double latch, $S^1$, supported in boxes or bearings $s$ $s$, and provided, upon its opposite sides or edges, with lugs or pawls $s^1$ $s^2$.

At the upper end of lever S is a bell-crank or angular lever, $S^2$, to which the upper end of slide-latch $S^1$ is connected, and by means of which said slide is operated.

Said bell-crank lever has connected with it a spring, $s^x$, which bears also against the face of lever S, and serves, by its tension, to hold the slide $S^1$ down to the extent of its throw on lever S when not held up by the hand of the operator.

The outer face of sheave R is notched at $R^x$ to receive the latch or pawl $s^1$, and the inner face of the ring of sheave T is notched at $t^x$ to receive latch $s^2$ on slide $S^1$.

The arrangement of the lifting-cords $u$ $v$ is shown in Fig. 3, the latter, $v$, passing direct from sheave T down to and connecting with an eye on the coupling-frame, and the former passing from sheave R down underneath a pulley at U, thence over pulley U' and back, connecting with the lever-standard $E^1$ on the inner shoe.

The operation of these parts is as follows: Suppose it is desired to lift the inner end only of the cutting apparatus for the purpose of passing an obstruction at such end, the driver grasps the lever S, and with it the handle of bell-crank lever $S^2$, bringing the two together, thereby drawing up the slide $S^1$, and causing the outer latch $s^2$ to engage with sheave T, when, by drawing lever S backward, the sheave T only is operated, and through cord $v$ the inner end of the finger-bar is raised to the desired height, while the outer end continues to rest on the ground.

If, after raising the inner end, as explained, another obstruction at the outer end of the bar should be discovered, the backward motion of lever $s$ may be extended until the lug $t^1$ on sheave T strikes the pin $r^1$ on sheave R, thereby operating sheave R and the cord $u$ and standard E', when, by a continued backward movement of lever S, the outer end may also be raised as required.

On the other hand, if an obstruction is discovered at the outer end first, the driver simply grasps lever S, leaving the bell-crank lever $S^2$ free, with the slide $S^1$ forced down, and the latch $s^1$ engaged with the sheave R, when, by drawing lever S backward, the sheave R only is operated, and through it the cord $v$ connecting with standard-lever $E^1$, thereby raising the outer end only of the finger-bar, as desired.

If, while in this position, it should be found necessary to raise the inner end also of said bar, a continued backward movement of lever S causes the pin $r^1$ on sheave R to engage with the lug $t$ on sheave T, thereby operating said sheave, and raising the inner end of the bar also.

It will be seen that by this arrangement of lifting devices the cutting apparatus is completely under the control of the driver, so far as the lifting of either or both ends is concerned.

Instead of the sheaves R and T, bell-crank or angular levers, armed with segments and interlocking spurs, may be employed, but the construction shown and described is preferred.

When raised as last above described, a spring-pawl, $w$, arranged, by preference, on a rock-shaft, $w^1$, engages with the ratchet $r$ on sheave R, and serves to hold the cutting apparatus in its raised position.

A foot-lever, $w^2$, attached to the inner end of shaft $w^1$, extends up through the slot $o^2$ in the pivoted foot-rest, and enables the driver to release the sheaves for lowering the cutting apparatus to the ground.

While the cutting apparatus is raised, as last above explained, it can, if desired, be reached by the driver in his seat, and raised to a vertical position, or until the stop-standard $E'$ strikes the coupling-frame, when, by means of a hook, $W^x$, attached to the tongue or tongue-plate, the cutting apparatus can be fastened in such position, when, with the driving mechanism thrown out of gear, the machine is ready for transportation.

The frame C, at its inner front corner, is provided, on its upper face, with two transverse parallel ribs, between which is placed an L-shaped standard, X, securely fastened to the frame by a bolt passing through the horizontal arm and through a slot in the main frame.

The upright arm of this standard is slotted, and is provided, on its face or side adjacent to the tongue-plate, with a ribbed or corrugated face, which matches with a corresponding face on the side of the tongue-plate Y.

A bolt or set-screw, passing through the slotted standard and tongue-plate, serves to hold the tongue at the desired adjustment.

The rear end of the tongue-plate Y is bent into a hook form, as shown at $y$, and engages with a hook, $z$, on a plate, Z, on the main frame.

This hook-connection constitutes a hinge, which permits the vertical adjustment of the tongue referred to; and the bolt passing through the slot in the main frame, and securing the standard X thereto, permits a lateral adjustment of the latter, and with it of the tongue Y', the width of the hook-plate being sufficient to permit of the desired lateral adjustment of the tongue.

A pin, $y'$, on the tongue-plate, serves to limit the forward throw of lever S, and to hold the same within convenient reach of the driver in his seat.

Having now described our invention, what we claim as new, and desire to secure by Letters Patent, is—

1. The angle-iron, skeleton, main truss-frame, constructed substantially as described.

2. The socket $c^3$ and perforated lugs $c^x$ on the main truss-frame, in combination with the inner arms of the coupling-frame or drag-bar, constructed and applied thereto substantially as described.

3. The arrangement of the triple-speed driving-gearing on the main axle B and shafts J J¹ J², placed at right angles to said axle, and in the described relation to the main frame.

4. The loose sleeve $b$ and adjustable bevel-wheel H on the main axle, in combination with the adjustable double bevel-pinions $h$ $h'$ on shaft J, substantially as described.

5. The casing for inclosing the gearing, made of wire-gauze or perforated sheet metal, constructed and applied substantially as and for the purpose set forth.

6. The driver's seat, made of wire-gauze, or other pliable or yielding material, when suspended from the C-shaped spring-standards M, substantially as and for the purpose described.

7. The compound lifting-lever, in combination with sheaves R and T, or equivalent devices, substantially as described, for raising the inner, outer, or both ends of the cutting apparatus at the option of the attendant.

8. The combination of the compound lifting-lever S, sheaves R and T, and foot-latch or pawl $w$, substantially as described.

9. The forked coupling-plate or frame D, with its opposing pivots, in combination with the sockets $c$ $c^1$ and cap-piece $c^2$, for uniting the shoe with the coupling-arm or fork D, as described.

10. The taper washer, in combination with the track-clearer, for changing the angle of said track-clearer to the path of the machine, as described.

11. The adjustable standard X and hook-plate Z, in combination with the tongue-plate, for giving the desired vertical and lateral adjustment to the tongue, as described.

JAMES BIRCH.
ADDISON CROSBY.
THOMAS BIRCH.

Witnesses:
A. ORRIS,
J. C. WORST.